May 31, 1966 D. E. FINK ET AL 3,253,731
HOT WATER STORAGE TANKS
Filed Dec. 23, 1963 3 Sheets-Sheet 1

INVENTORS
DONALD E. FINK
RAYMOND A. KRISHOCK
BY
Pringley, Baird, Clayton,
Miller & Vogel,
ATTYS.

INVENTORS
DONALD E. FINK
RAYMOND A. KRISHOCK

ATTYS.

May 31, 1966     D. E. FINK ET AL     3,253,731
HOT WATER STORAGE TANKS

Filed Dec. 23, 1963     3 Sheets-Sheet 3

INVENTORS
DONALD E. FINK
RAYMOND A. KRISHOCK
BY

ATTYS.

United States Patent Office 3,253,731
Patented May 31, 1966

3,253,731
HOT WATER STORAGE TANKS
Donald E. Fink, Milwaukee, Wis., and Raymond A. Krishock, Mansfield, Ohio, assignors to General Electric Company, a corporation of New York
Filed Dec. 23, 1963, Ser. No. 332,579
10 Claims. (Cl. 220—9)

The present invention relates to hot water storage tanks.

Conventional hot water storage tanks essentially comprise an upstanding hollow steel tank body, a batt of fibrous glass surrounding the tank body, and an outer jacket surrounding the fibrous glass batt and retaining the batt in place and in heat-insulating relationship with the tank body. Ordinarily, the jacket is formed of sheet steel, and the outer surface thereof carries a decorative finish in the form of a resinous enamel or paint. The tank body also includes and has as a part thereof a facility for supplying thereto the cold water to be heated and a facility for supplying therefrom the hot water stored therein. Finally, the storage tank includes a facility for heating the water stored in the tank body.

While hot water storage tanks of the character described are quite satisfactory in operation, such tanks are more expensive to manufacture than is desirable. In addition, the outer jacket of the storage tank is subject to scuffing, denting and like damage in shipment, rendering it necessary to replace the outer jacket in order to provide the customer with the storage tank in perfect condition. Not only is such replacement of the outer jacket expensive from the standpoint of the manufacturer and the distributor, but it is to the great dissatisfaction of the customer.

Accordingly, it is a general object of the invention to provide a hot water storage tank comprising an improved unitary heat-insulating jacket that is permanently adhered to the exterior of the tank body thereof and that includes a relatively thick inner layer of resilient cellular structure and a relatively thin outer layer of strong tough dense structure, whereby the inner layer not only performs the fundamental heat-insulating function, but also serves as a cushion to prevent damage to the outer layer in the event the outer layer is struck by an object exteriorly thereof incident to handling, shipment or use of the hot water storage tank.

Another object of the invention is to provide a hot water storage tank of the character noted, wherein the exterior surface of the outer layer is of finished decorative appearance incorporating the desired texture, geometric pattern, color pigmentation, etc.

Another object of the invention is to provide a hot water storage tank of the character noted, wherein the inner layer mentioned consists essentially of a suitable synthetic organic resinous material and the outer layer mentioned is a composite structure including an inner ply providing a good gas barrier, an intermediate ply providing good mechanical strength and an outer ply essentially of a synthetic organic resin of strong tough dense structure.

A further object of the invention is to provide a hot water storage tank of the character noted, wherein the inner layer essentially comprises a polyurethane resin of closed-cell structure having substantial inert gas entrapped therein and the outer layer essentially comprises a composite structure including an inner ply providing a good gas barrier to the inert gas, an intermediate ply of kraft board and an outer ply of a polyester resin.

Further features of the invention pertain to the particular arrangement of the elements of the hot water storage tank, whereby the above-outlined and additional operating features thereof are attained.

The invention, both as to its organization and method of operation, together with further objects and advantages thereof, will best be understood by reference to the following specification, taken in connection with the accompanying drawings, in which.

Figure 5:
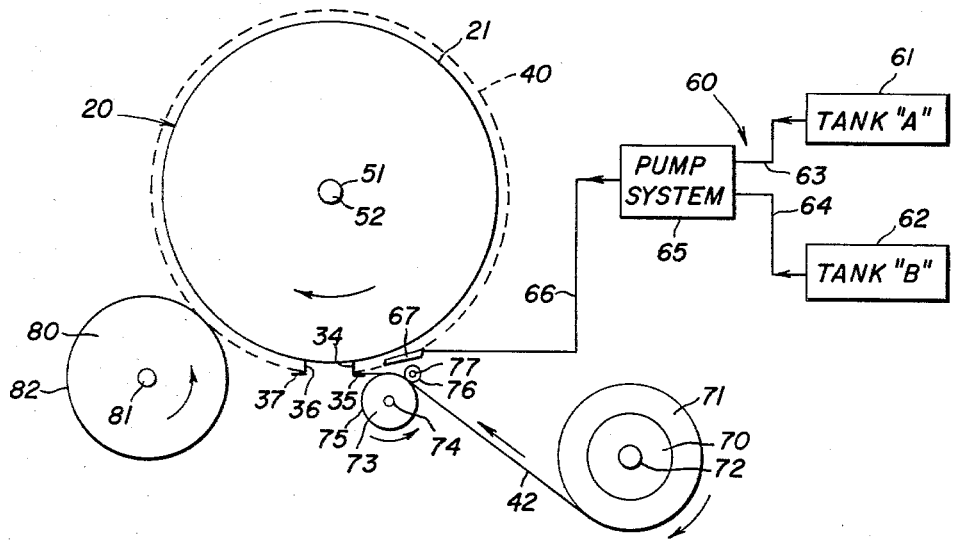
Figure 6:
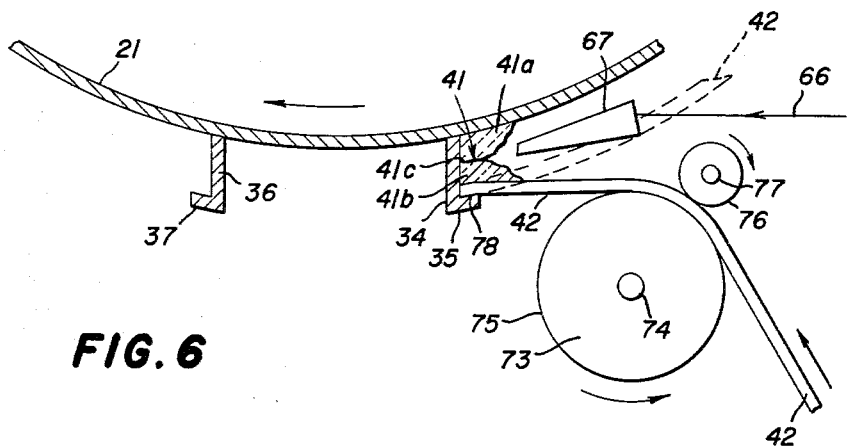

FIG. 5 is a schematic and diagrammatical view of the arrangement of the mold apparatus and materials employed in making the storage tank; and FIG. 6 is an enlarged view of a portion of the mold apparatus as illustrated in FIG. 5 and showing particularly the details of spraying the mixture of inert gas and uncured ingredients of polyurethane resin into the gap between the exterior surface of the tank body and the interior surface of the outer wrap material.

Referring now to FIGS. 1 to 4, inclusive, the appliance 10 there illustrated, and embodying the features of the present invention, is in the form of a hot water storage tank of the household type and essentially comprises an upstanding hollow steel tank body 20 including a tubular side wall 21, a concave dish-shaped bottom end wall 22 and a convex dish-shaped top end wall 23. The bottom end wall 22 is provided with a surrounding tubular flange 24 which is pressed into the extreme bottom end of the side wall 21 and is suitably welded in place to provide a liquid-tight joint therebetween. The top end wall 23 is provided with a surrounding tubular flange 25 that abuts the extreme top end of the side wall 21 and is suitably seam-welded in place to provide a liquid-tight joint therebetween.

Two spud openings 26 and 27 are provided in the lower portion of the side wall 21; and two threaded fixtures or nipples 28 and 29 respectively surround the two spud openings 26 and 27 and are securely welded in liquid-tight relation to the side wall 21. A generally centrally disposed spud opening 30 is provided in the top end wall 23, and a threaded fixture or nipple 31 surrounds the spud opening 30 and is securely welded in liquid-tight relation to the top wall 23. The interior surfaces of the tank body 20 are ordinarily provided with a protective liner, not shown, that may take the form of a layer or coating of zinc, or may take the form of a layer of glass, all in a conventional manner.

As illustrated, the storage tank 10 is of the electrically heated type, whereby an immersion heater, not shown, may be inserted through the fixture 28 and the spud opening 26 into the lower portion of the tank body 20; which immersion heater may be of any conventional type of electrical heating unit; and which immersion heater is secured in place in liquid-tight relation with the fixture 28 and is supplied with electrical power from the exterior; all in a conventional manner. Since the electric heating system for the storage tank 10 forms no part of the present invention the immersion heater mentioned has not been illustrated; and similarly, the temperature responsive thermostat for selectively controlling the energization of the immersion heater, together with the terminal board and the other wiring elements therefor, have been omitted in the interest of brevity.

The water to be heated may be supplied into the lower portion of the tank body 20 via the fixture 29 and the spud opening 27; and the hot water stored in the tank body 20 may be withdrawn therefrom via the spud opening 30 and the fixture 31. The upwardly directed flow of the water through the tank body 20 is produced by the pressure of the water supply system, not shown, that is connected to the fixture 29; all in a conventional manner.

The fixtures 28 and 29 are housed in a substantially box-like steel structure 32 arranged in surrounding relationship therewith and carried by the adjacent portion of the side wall 21. More particularly, structure 32 is of tubular form and carries upon the inner end thereof a pair of outwardly extending flanges 33 that abut the adjacent portion of the side wall 21 and are suitably secured thereto. The outer end of the structure 32 carries a removable cover, not shown; whereby the fixtures 28 and 29 are readily accessible from the exterior when the cover mentioned is removed from the extreme outer end of the structure 32. Also, in passing it is mentioned that the terminal board, and other electrical elements, not shown, may be arranged within the structure 32 as a matter of convenience.

Figure 1:
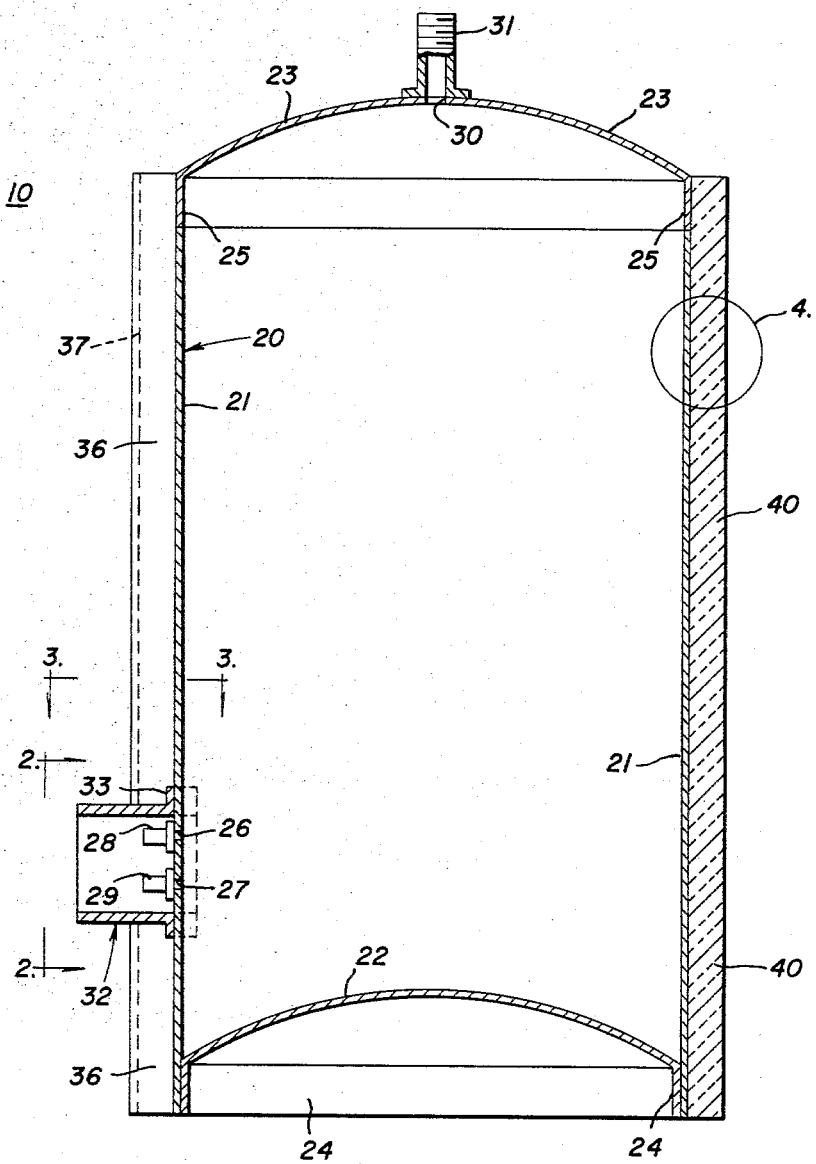
FIGURE 1 is a vertical sectional view of a hot water storage tank embodying the present invention.
Figure 2:
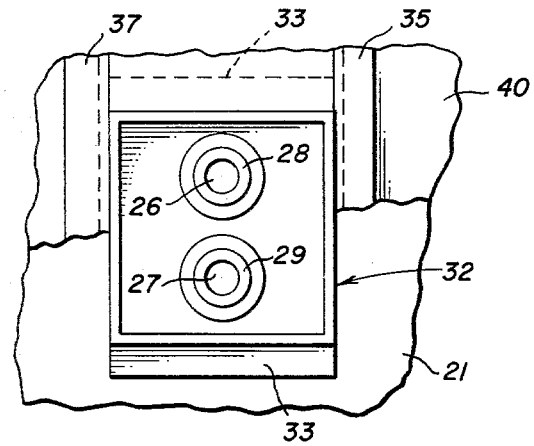
FIG. 2 is an enlarged fragmentary side elevational view of the lower portion in the storage tank, illustrating a box-like structure incorporated therein and rendering accessible from the exterior certain spud openings that are provided in the tank body, this view being taken in the direction of the arrows along the line 2—2 in FIG. 1.
Figure 3:
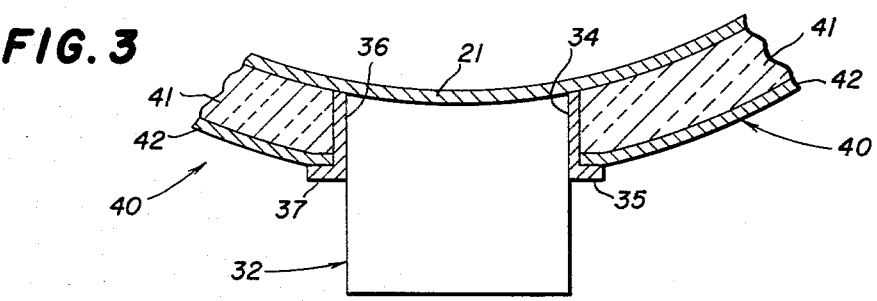
FIG. 3 is an enlarged fragmentary horizontal sectional view of the lower portion of the storge tank taken in the direction of the arrows along the line 3—3 in FIG. 1.
Figure 4:
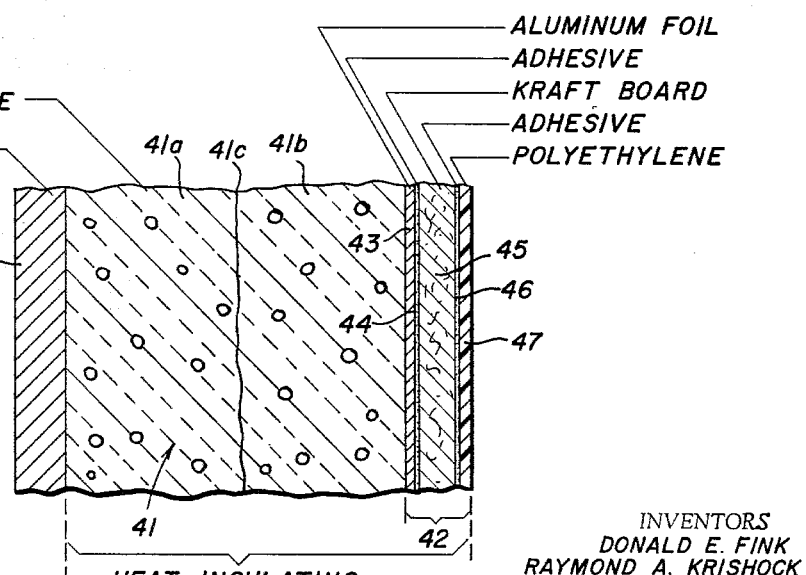
FIG. 4 is a greatly enlarged vertical sectional view of a portion of the wall structure of the storage tank, as indicated by the circled marked 4 in FIG. 1.

Further, the storage tank 10 comprises a composite outer outer jacket 40 in the form of a tubular body disposed in surrounding relation with the side wall 21 of the tank body 20. As best shown in FIG. 4, the heat-insulating jacket 40 is of special construction including a relatively thick inner layer 41 of synthetic organic resin of resilient cellular structure and intimately adhered and bonded to the adjacent outer surface of the side wall 21, and a relatively thin outer layer 42 of composite structure intimately adhered and bonded to the inner layer 41 at the boundary or junction therebetween. Preferably, the inner layer 43 consists essentially of a polyurethane resin, and more particularly, a polyester-urethane resin. The outer layer 42 includes an inner ply 43 which serves as a gas barrier, as explained more fully hereinafter, and preferably comprises an imperforate metal foil, such as aluminum foil; the outer surface of the inner ply 43 is firmly secured by an adhesive layer 44 to the inner surface of an intermediate ply 45 which is preferably formed of kraft board, and more particularly of relatively thick kraft liner board of the type commonly used for milk carton stock; the outer surface of the intermediate ply 45 carries an adhesive layer 46 which is also secured to the inner surface of an outer ply 47, the outer ply 47 preferably being formed of a synthetic organic resin, and for example, may consist essentially of a polyester resin. As explained more fully hereinafter, the polyurethane resin in the inner layer 41 is foamed in place and in contact with the steel wall 21 and the outer layer 42, and accordingly is intimately bonded both to the side wall 21 and the outer layer 42; whereby the heat-insulating jacket 40 is of unified construction and is permanently secured to the side wall 21, so as to integrate the tank body 20 and the jacket 40.

In a constructional example of the hot water storage tank 10 of 50-gallon capacity, the inside diameter of the substantially cylindrical side wall 21 may be approximately 20"; the vertical height between the crown of the bottom end wall 22 and the crown of the top end wall 23 may be approximately 40"; and each of the walls 21, 22 and 23 may have a thickness of about 0.115". In the heat-insulating jacket 40, the inner layer 41 has a thickness of at least about 1" and the outer layer 42 has a thickness in the general range 20–50 mils.

Reverting to the construction and arrangement of the heat-insulating jacket 40, and particularly to the outer layer 42 thereof, the outer polyester resin ply 47 may contain any desired color pigment as is well understood in the resin molding art, whereby the appliance 10 may have any desired color to match or carry out any desired color scheme in a kitchen or other room of the home in which the appliance 10 is arranged. Also the exterior surface of the outer polyester resin ply 47 may be provided with a wide variety of textures, geometric patterns, and other decorative devices and effects, that are considered to improve the appearance of the appliance 10; all in a well-known manner in the production of polyester resin articles of manufacture.

The inner layer 41 is formed preferably of a polyurethane resin, the polyester-urethane resins being particularly useful in the present invention. The resin of the inner layer 41 further is of closed-cell structure entrapping therein substantial inert gas selected from the class consisting of the chlorine-fluorine substituted alkanes. This class of inert gases comprises $CHClF_2$, $CHCl_2F$, $CCl_2F_2$, $CCl_3F$, $C_2Cl_2F_4$ and $C_2Cl_3F_3$; and of these gases $CCl_3F$ and $CCl_2F_2$ are normally preferred as a matter of efficiency and economy. The inert gases are entrapped within the polyurethane resin forming the inner layer 41 and are placed therein by using the inert gas to foam the polyurethane resin. The utilization of these inert gases as the blowing or foaming agent is very important since a typical polyurethane resin blown with $CCl_3F$ has a K-factor as low as in the range 0.118–0.125 B.t.u./in./sq. ft./hr./° F. The density of such cellular polyurethane resins is in the range from about 1.5 lbs. per cu. ft. to about 2.5 lbs. per cu. ft., the preferred density being 1.6 lbs. per cu. ft.

Reverting to the construction and arrangement of the outer layer 42, the inner ply 43 thereof may be made of any imperforate material which provides a good barrier to the inert gas used in and entrapped within the polyurethane resin of the inner layer 41; a preferred material of construction of the inner ply 42 is metal foil, the preferred metal foil being aluminum foil having a thickness in the range from about 0.25 mil to about 4.0 mils, the preferred thickness being about 2 mils. The intermediate ply 45 of kraft board has a thickness in the range from about 20 mils to about 40 mils, the preferred thickness being about 32 mils. The outer ply 47 is preferably formed of polyester resin and has a thickness in the range from about 1 mil to about 3 mils, the preferred thickness being about 2 mils. Both of the adhesive layers 44 and 46 may be formed of any suitable adhesive, the preferred adhesive being a "Hycar" rubber cement or adhesive that consists essentially of copolymers of butadiene and acrylonitrile.

In the hot water storage tank 10, the construction and arrangement of the jacket 40 is very advantageous, since the side wall 21 of the tank body 20 is encased in the relatively thick layer of polyurethane resin; which resin is an outstanding heat-insulating material in the foamed or cellular form described with the inert gas entrapped therein, whereby the heat loss from the tank body 20 through the wall 21 is exceedingly low. Also, in the jacket 40 the polyurethane resin layer 41 is quite resilient; which arrangement is particularly advantageous since the inner layer 41 thus serves as a cushion for the outer layer 42. The outer ply 47 of polyester resin is quite hard, as well as smooth, strong, tough and dense, as previously mentioned, whereby the outer surface of the outer layer 42 is abrasion-resistant and is not readily dented by being struck by foreign objects. Moreover, these normal qualities of the outer ply 47 are materially improved by the cushioning effect of the supporting resilient inner layer 41. Thus, substantial damage to the outer layer 42 in normal use is substantially eliminated, and shipping damage to the outer layer 42 and particularly the outer ply 47 thereof is greatly minimized; whereby the jacket 30 carried by the hot water storage tank 10 is vastly superior to the usual sheet steel jacket that is employed in the conventional hot water storage tank.

Furthermore, the excellent, shock-resistant, heat-insulating properties of the polyurethane layer 41 are not subject to deterioration in use, since this class of resins and particularly the polyester-urethane resins, is entirely stable at temperatures substantially in excess of 180° F., which is about as high a temperature as is ever encountered in the hot water storage tank 10. Also, the outer ply 47 of polyester resin is water-resistant, and is altogether chemically stable under the operating conditions of the appliance 10, whereby this resin is characterized by an exceedingly long useful life.

In the manufacture of the hot water storage tank 10, as described more fully hereinafter, there is employed mold apparatus 50, as shown in FIGS. 5 and 6, which mold apparatus 50 includes structure diagrammatically illustrated at 51 for supporting the tank body 20 during the molding operation, the support structure 51 being arranged and adapted to rotate the tank body 20 about the longitudinal axis thereof with the longitudinal axis arranged in a generally horizontal position, the apparatus 51 and the tank body 20 mounted thereon being more particularly rotated about the axis designated by the numeral 52 by a source of motive power not shown. The mold apparatus 50 further comprises a source of uncured ingredients of the polyurethane resin to be used in forming the inner layer 41 and more specifically, includes a first tank 61 and a second tank 62, the first tank 61 being designated as tank "A" and the second tank 62 being designated as tank "B," and being adapted respectively to contain uncured ingredients of the polyurethane resin. The tanks 61 and 62 are respectively connected by piping 63 and 64 to the inlet connections of a pump system 65, the ingredients in the tanks 61 and 62 being propelled through the piping 63 and 64, respectively, and into the pump system 65 under the urging thereof; and the uncured ingredients are further mixed within the pump system 65 and are expelled therefrom under pressure through the piping 66 and into a spray nozzle system diagrammatically illustrated as at 67, it being understood that a plurality of the nozzles 67 is provided along the length of the tank body 20, the outlets of the nozzles 67 generally lying along a line substantially parallel to the axis 52 of rotation of the support structure 51 and the tank body 20 supported thereby.

The mold apparatus 50 further comprises a source of the wrap material forming the thin outer layer 42, the source of wrap material being generally designated by the numeral 70 and comprising an elongated core having a length equal to the length of the side wall 21 and having wound therearound a quantity of the wrap material as at 71, the entire source 70 being mounted upon an axle 72 for rotation, the axis of the axle 72 being substantially parallel to the axis 52 so that the wrap material 42 can be fed directly from the source 70 and wound about the tank body 20 and particularly the side wall 21 thereof. Structure is provided for feeding the wrap material 42 from the source 70 and including a main roll 73 mounted adjacent to the tank body 20 to be coated and mounted for rotation about an axle 74 by drive structure (not shown) so as to cause rotation of the roll 73 and particularly the outer surface 75 thereof in the direction indicated by the arrow, the wrap material 42 being fed upon and driven by the outer surface 75 of the roll 73. A tensioning roller 76 is provided adjacent to the main feed roll 73, the tensioning roll 76 being mounted for rotation about an axis 77 and pressing against the other surface of the wrapped material 42 to urge the wrap material 42 against the surface 75 of the main feed roll 73 so as to be able to control the tension of the wrap material 42 during the feeding thereof.

There further is provided in the mold apparatus 50 a final smoothing or ironing roll 80 mounted for rotation upon an axle 81 and driven by a suitable prime mover (not shown), the roll 80 having a smooth cylindrical outer surface 82 which is adapted to engage the outer surface of the heat-insulating jacket 40 shortly after application thereof to the tank body 20 so as to smooth and iron out any irregularities therein.

Turning now to the method of making or manufacturing the hot water storage tank 10, the tank body 20, together with the fixtures 28, 29 and 31 and the flanges 34 and 36 are fabricated and assembled in a conventional manner, and the exterior surfaces of the assembly are suitably cleaned, employing an alkaline wash or equivalent treatment. Likewise, the box-like structure 32 is fabricated, and the exterior surfaces thereof are suitably cleaned. Then the structure 32 is assembled upon the exterior of the side wall 21 and suitably secured in place in surrounding relation with the fixtures 28 and 29 and between the flanges 34 and 36, employing, for example, a suitable cement or adhesive. The thus completed assembly is then preheated, and more particularly, the tank body 20 is preheated to a temperature in the general range 120° F. to 180° F., and preferably to a temperature of approximately 125°. The preheated tank body 20 is then mounted upon the support structure 51 so that the tank body 20 rotates about the axis 52, the support structure 51 and the tank body 20 mounted thereon being rotated in the direction of the arrow on the tank body 20 in FIG. 5.

As the next step in the manufacturing method, the free end of the wrap material 42 is fed from the supply 70 between the rolls 73 and 76 and the edge is suitably secured as by an adhesive at 78 (see FIG. 6.) along the entire length thereof to the flange 35, the outer polyethylene ply 47 being disposed downwardly as viewed in FIG. 6 and the aluminum foil ply 43 being disposed upwardly or toward the side wall 21 as viewed in FIG. 6, it being understood that the wrap material 42 extends the entire length of the tank body 20 and more specifically the entire length of the flange 35 thereon.

Next all of the various moving parts of the mold apparatus 50 are set into operation substantially simultaneously. More specifically, the pump system 65 is actuated to supply a mixture of the ingredients in the tanks 61 and 62 through the piping 66 and to the nozzles 67 so as to blow in place the inner layer 41 as is diagrammatically illustrated in FIG. 6, the blown or foamed resin being confined between the outer surface of the tank body such as the tank wall 21 and the inner surface of the wrap material 42 and particularly the aluminum foil inner surface thereof; preferably retainer structure (not shown) is provided at each end of the tank body 20 to confine the foamed resin in the space between the side wall 21 and the wrap material 42, which retainer structure is subsequently removed after the foamed resin has set or cured. Initially the space or gap between the outer surface of the side wall 21, for example, and the inner surface of the wrap material 42 is set and determined by the distance between the flange 35 and the side wall 21, this space or gap being preselected in accordance with the desired thickness of the inner layer 41 and being for example about 1″. (It is desirable to maintain this gap substantially constant around the entire circumference of the tank body 20 and to this end the roll 73 and 76 are carefully adjusted so that the tension imparted thereby to that portion of the wrap material 42 between the flange 35 and the rolls 73–76 maintains the gap at the preselected thickness, so that the wrap material 42 is guided along a cylindrical path as is diagrammatically illustrated by the dashed lines to the right in FIG. 6.

Accordingly, immediately after starting the pump system 65, it is necessary substantially simultaneously to begin the rotation of the tank support structure 51 so as to rotate the tank body 20 in the direction of the arrow thereon in FIG. 5 and to begin rotation of the rolls 73 and 76 in the directions of the associated arrows in FIGS. 5 and 6, the initiation of the operation of the pump system 65, the rotation of the support structure 51 and the rotation of the rolls 73 and 76 being, for example, automatically controlled by control mechanism not shown.

As the resin is blown or foamed into position in the gap between the outer surface of the tank body 20 and the inner surface of the wrap material 42, the tank body 20 is rotated in the clockwise direction in FIGS. 5 and 6 and eventually the outer surface of the wrap material 42 is brought into contact with the upper surface 82 of the roll 80. At the time that the outer surface 82 of the roll 80 contacts the outer surface of the wrap material 42, the blown resin in the inner layer 41 has not yet been fully set or cured, and accordingly, contact of the flexible wrap material 42 backed up with the still deformable resin in the layer 41 with the smooth surface 82 of the roll 80 serves to iron or press the components of the heat-insulating jacket 40 so as to impart a smooth and even configuration to the outer surface thereof and particularly to the outer surface of the wrap material 42, the roll 80 and the outer surface 82 thereof extending the entire length of the wrap material 42 so as simultaneously to iron or press the entire surface thereof in contact with the roll 80. Preferably the roll 80 is driven in the direction of the arrow thereon in FIG. 5 and is driven at a rate and in such a manner as to achieve the desired ironing and pressing function thereof.

The various parts continue to operate as described above until the mold apparatus 50 has completely surrounded the tank body 20 with the wrap material 42 and trapping the blown resin in the inner layer 41 thereof; and more specifically, until the outer wrap material 42 arrives at the flange 37, at which time the wrap material 42 is cut by apparatus (not shown) and the cut outer end thereof firmly secured to the flange 37 to form a seal therewith. The tank body 20 is then removed from the support structure 51, care being taken not to disturb the heat-insulating jacket 40 until the foamed resin in the inner layer 41 has set. As soon as the resin layer 41 has been fully set or cured, the tank body 20 is ready for further processing in the usual manner.

Considering now the general chemistry involved in the production of the foamed resin inner layer 41, and particularly the production of the polyurethane resin of the preferred type, an addition reaction may be obtained between a polyisocyanate that is difunctional or higher and a hydroxyl-rich compound containing at least two hydroxyl groups per molecule (such as a glycol, a polyester, a polyether, etc.), whereby polymers are produced that are linked by repeating urethane units (—NH—COO—). Thus, TDI (tolylene diisocyanate) and a hydroxyl-rich polyester (diethylene glycol adipate) may be reacted to form a typical polyurethane resin. In the reaction, gas is liberated, so as to cause foaming, whereby the resin produced is of the thermoset type, and the structure thereof is cellular. The cellular structure of the resin can be readily controlled by the introduction of a blowing agent, such as the chlorine-fluorine substituted alkanes described above. Of course, the properties obtained in the resin produced are largely determined by the particular species of the two fundamental chemical ingredients mentioned. In this connection, it is pointed out that in the foregoing general description of the present method, the reference to "uncured polyurethane resin" pertains to the above-mentioned ingredients that react to form the polyurethane resin, and in passing it is mentioned that these ingredients begin to react immediately upon contact thereof, whereby the "uncured polyurethane resin" must be worked promptly, so as to prevent the undesired setting-up or curing thereof, as is well understood in the resin molding art. Of course, the rate of curing of the "uncured polyurethane resin" is greatly accelerated as the temperature thereof is elevated above the ambient temperature.

The preferred polyurethane resins for use in the present invention are polyester-urethane resins and the following is an example of such a resin recommended for the production of the inner layer 41 of the heat-insulating jacket 40. As explained above when describing the mold apparatus 50, the tank "A" is provided which contains certain ones of the ingredients and the tank "B" is provided containing certain others of the ingredients of the uncured polyesterurethane resin; the contents of tank "A" are maintained at a temperature of about 70° F. and the contents of tank "B" are maintained at a temperature of about 190° F.; the contents of the two tanks are mixed within the pump system 65 in about equal parts by weight and are immediately applied through the piping 66 and the nozzles 67 to the gap between the outer surface of the tank body 20 and the inner surface of the wrap material 42.

Tank "A" contains the following ingredients in parts by weight:

27 parts trichloromonofluoromethane "Freon-11" (Du Pont)
71¾ parts tolylene diisocyanate "70 Nacconate 4040" (Allied Chemical)
1¼ parts silicone compound "L 530" (Union Carbide)

Tank "B" contains the following ingredients in parts by weight:

100 parts chlorinated polyester "Hetrafoam 250" (Durez Plastics)

In tank "A" the trichloromonofluoromethane is a propellant and the silicone compound is an agent for controlling the cell structure of the cured polyurethane resin; and in tank "B" the chlorination of the polyester renders the cured polyurethane resin flame self-quenching.

The foregoing example of the chemistry of the polyurethane resin is well known; whereby this formulation has been set forth herein as a recommendation, so as positively to insure that the corresponding resin incorporated in the appliance 10 possesses the desired chemical and physical properties that are highly useful in this appliance 10, as previously explained in conjunction with the construction and arrangement thereof. Thus, it will be readily apparent that other chemical formulations of this particular resin and other equivalent resins of other types may be substituted in the present method in the manufacture of the present appliance 10.

Referring now to FIG. 6 of the drawings there is illustrated a preferred method of directing the blown or foamed polyurethane resin into the gap between the tank body wall 21 and the wrap material 42. As illustrated, the polyurethane resin mixture is blown into the center of the gap so that the resin mixture impinges simultaneously upon both the outer surface of the wall 21 and the inner surface of the wrap material 42 to form respectively the resin bodies 41a and 41b thereon so that there is a good contact and firm adherence between the outer surface of the wall 21 and the adjacent surface of the resin body 41a and a good contact and firm adherence between the inner surface of the wrap material 42 and the associated surface of the resin body 41b. There further is formed between the resin bodies 41a and 41b a knit line 41c which is disposed substantially centrally between the outer surface of the side wall 21 and the inner surface of the wrap material 42 and substantially at the midpoint of the inner resin layer 41. Applying the foamed resin in the manner illustrated in FIG. 6 minimizes the entrapment and formation of air bubbles between the outer surface of the wall 21 and the associated resin body 41a and between the inner surface of the wrap material 42 and the associated resin body 41b, so as to minimize and essentially to eliminate cold shrinkage of the heat-insulating jacket 40, it having been found that the spraying of the foamed resins as illustrated so that the resin rises both from the surface of the tank wall 21 and the surface of the wrap material 42 toward each other as described forms a structure that exhibits no cold shrinkage even in tests conducted at −20° F. for 24 hours.

In view of the foregoing it is apparent that there has been provided a hot water storage tank of improved and simplified construction and arrangement involving a unification of the tank body and the heat-insulating jacket carried thereby. Also, there has been provided such a storage tank that may be manufactured in an economical and ready manner.

While there has been described what is at present considered to be the preferred embodiment of the invention, it will be understood that variations and modifications may be made therein, whereby it is intended to cover in the appended claims all such modifications as fall within the true spirit and scope of the invention.

What is claimed is:

1. A hot water storage tank comprising a hollow metal tank body, and a heat-insulating jacket carried by the exterior of said tank body, said jacket including a relatively thick inner layer intimately adhered to the outer surface of said tank body and a relatively thin composite outer layer intimately adhered to said inner layer at the boundary therebetween, said inner layer consisting essentially of a synthetic organic resin of resilient cellular structure, said composite outer layer including an inner ply and an intermediate ply intimately adhered to said inner ply and an outer ply intimately adhered to said intermediate ply, said inner ply consisting essentially of an imperforate material providing a good gas barrier, said intermediate ply consisting essentially of kraft board, said outer ply consisting essentially of a synthetic organic resin of strong tough dense structure.

2. A hot water storage tank comprising a hollow metal tank body, and a heat-insulating jacket carried by the exterior of said tank body, said jacket including a relatively thick inner layer intimately adhered to the outer surface of said tank body and a relatively thin composite layer intimately adhered to said inner layer at the boundary therebetween, said inner layer consisting essentially of a polyester-urethane resin of resilient cellular structure, said composite outer layer including an inner ply and an intermediate ply intimately adhered to said inner ply and an outer ply intimately adhered to said intermediate ply, said inner ply consisting essentially of an imperforate metal foil, said intermediate ply consisting essentially of kraft board, said outer ply consisting essentially of a polyethylene resin of strong tough dense structure.

3. A hot water storage tank comprising a hollow metal tank body, and a heat-insulating jacket carried by the exterior of said tank body, said jacket including a relatively thick inner layer intimately adhered to the outer surface of said tank body and a relatively thin composite outer layer intimately adhered to said inner layer at the boundary therebetween, said inner layer having a thickness of about 1″ and consisting essentially of polyurethane resin of resilient cellular structure, said composite outer layer including an inner ply and an intermediate ply intimately adhered to said inner ply and an outer ply intimately adhered to said intermediate ply, said inner ply having a thickness from about 0.25 mil to about 4 mils and consisting essentially of an imperforate material providing a good gas barrier, said intermediate ply having a thickness from about 20 mils to about 40 mils and consisting essentially of kraft board, said outer ply having a thickness from about 1 mil to about 3 mils and consisting essentially of a synthetic organic resin of strong tough dense structure.

4. A hot water storage tank comprising a hollow metal tank body, and a heat-insulating jacket carried by the exterior of said tank body, said jacket including a relatively thick inner layer intimately adhered to the outer surface of said tank body and a relatively thin composite outer layer intimately adhered to said inner layer at the boundary therebetween, said inner layer consisting essentially of a blown polyurethane resin of closed-cell structure entrapping substantial inert gas, wherein said inert gas consists essentially of chlorine-fluorine substituted alkane, said composite outer layer including an inner ply and an intermediate ply intimately adhered to said inner ply and an outer ply intimately adhered to said intermediate ply, said inner ply consisting essentially of an imperforate material providing a good barrier to said inert gas, said intermediate ply consisting essentially of kraft board, said outer ply consisting essentially of an synthetic organic resin of strong tough dense structure.

5. The hot water storage tank set forth in claim 4, wherein the exterior surface of said outer ply carries a geometric pattern to lend a decorative appearance thereto.

6. The hot water storage tank set forth in claim 4, wherein the resin of said outer ply incorporates a color pigment to lend a decorative appearance thereto.

7. The hot water storage tank set forth in claim 4, wherein said inert gas consists essentially of chlorine-fluorine substituted methane.

8. The hot water storage tank set forth in claim 4, wherein said inert gas consists essentially of chlorine-fluorine substituted ethane.

9. A hot water storage tank comprising a hollow metal tank body, and a heat-insulating jacket carried by the exterior of said tank body, said jacket including a relatively thick inner layer intimately adhered to the outer surface of said tank body and a relatively thin composite outer layer intimately adhered to said inner layer at the boundary therebetween, said inner layer having a thickness of about 1″ and consisting essentially of a blown polyurethane resin of closed-cell structure entrapping substantial inert gas, wherein said inert gas consists essentially of a chlorine-fluorine substituted alkane, said composite outer layer including an inner ply and an intermediate ply intimately adhered to said inner ply and an outer ply intimately adhered to said intermediate ply, said inner ply having a thickness from about 0.25 mil to about 4 mils and consisting essentially of an imperforate metal foil providing a barrier to said inert gas, said intermediate ply having a thickness from about 20 mils to about 40 mils and consisting essentially of kraft board, said outer ply having a thickness from about one mil to about 3 mils and consisting essentially of a synthetic organic resin of strong tough dense structure.

10. A hot water storage tank comprising a hollow metal tank body, and a heat-insulating jacket carried by the exterior of said tank body, said jacket including a relatively thick inner layer intimately adhered to the outer surface of said tank body and a relatively thin composite outer layer intimately adhered to said inner layer at the boundary therebetween, said inner layer having a thickness of about 1″ and consisting essentially of a blown polyester-urethane resin of closed-cell structure entrapping substantial inert gas, wherein said inert gas consists essentially of a chlorine-fluorine substituted alkane, said composite outer layer including an inner ply and an intermediate ply intimately adhered to said inner ply and an outer ply intimately adhered to said intermediate ply, said inner ply having a thickness of about 2 mils and consisting essentially of an imperforate aluminum foil providing a good barrier to said inert gas, said intermediate ply having a thickness of about 30 mils and consisting essentially of kraft board, said outer ply having a thickness of about 2 mils and consisting essentially of a polyethylene resin of strong tough dense structure.

References Cited by the Examiner

UNITED STATES PATENTS

| 2,961,116 | 11/1960 | Jeppson | 220—9 |
| 3,172,925 | 3/1965 | Preotle | 264—45 |
| 3,174,642 | 3/1965 | Loewenthal et al. | 220—9 |
| 3,177,271 | 4/1965 | Slayman | 264—45 |

THERON E. CONDON, *Primary Examiner.*

LOUIS G. MANCENE, *Examiner.*

G. T. HALL, *Assistant Examiner.*